Aug. 31, 1926.
E. O. YOUNG
1,597,945
VACUUM TIRE PATCH
Original Filed Nov. 10 1925
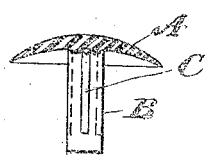
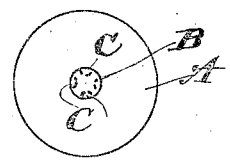
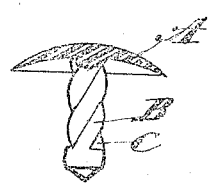
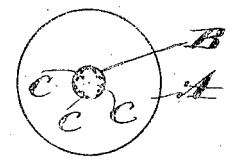
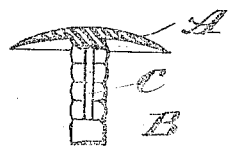
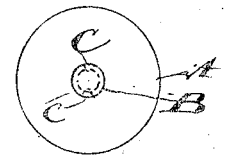

Patented Aug. 31, 1926.

1,597,945

UNITED STATES PATENT OFFICE.

EDWARD O. YOUNG, OF CLEVELAND HEIGHTS, OHIO.

VACUUM TIRE PATCH.

Original application filed November 10, 1925, Serial No. 68,187. Divided and this application filed December 23, 1925. Serial No. 77,311.

The objects of the invention are to provide an elastic adhesive tire patch for a puncture in a tire or casing, and comprises a thin cup shaped rubber patch or vacuum cup, having a rubber stem that is longitudinally and externally grooved, to provide means for distributing the cement or rubber putty, by means of which the patch is permanently attached to the tire.

The invention is illustrated in the accompanying drawings, hereinafter more fully described, and specifically pointed out in the claim.

In the accompanying drawings Fig. 1 is a transverse section of the patch showing a longitudinally grooved stem; Fig. 2 is a plan thereof; Fig. 3 is a similar view showing a spirally and longitudinally grooved stem; Fig. 4 is a plan thereof; Fig. 5 illustrates a transversely ribbed and longitudinally slotted stem for a similar patch, and Fig. 6 is a plan view of Fig. 5.

In these views, A represents a thin cup shaped patch and B is a centrally projecting stem therefor; C, C, are longitudinal grooves which preferably terminate at a point somewhat spaced from the outer end, thus forming a head D, such as is illustrated in my pending application Ser. No. 69,819, filed Nov. 18, 1925, for a self-cleansing tool, which can be grasped by the slotted end of the tool to assist in drawing the stem through the tire, and prevents the cement from entering the tool.

The head also prevents the cement with which the cup shaped patch is filled from oozing past the stem and retains the cement in the tire.

In use the cup shaped cavity in the patch is filled with cement and the patch is pressed down upon the surface of the tire after the stem has been inserted in the puncture and from its shape the thin walls of the cup will cling to the tire by suction or atmospheric pressure until the cement hardens.

Having described the invention, what I claim as new and desire to secure by Letters Patent is:

A tire patch comprising a cup-shaped body of thin flexible material, and a central stem therefor having longitudinal grooves therein extending from said body a portion of its length, substantially as set forth.

In testimony whereof I hereunto affix my signature.

EDWARD O. YOUNG.